United States Patent
Glaser et al.

(10) Patent No.: US 8,469,310 B2
(45) Date of Patent: Jun. 25, 2013

(54) AIRFREIGHT CONTAINER AND AIRCRAFT

(75) Inventors: Daniel Glaser, Hamburg (DE); Oliver Thomaschewski, Hamburg (DE); Peter Theis, Hamburg (DE); Alexander Wieser, Kirchseeon (DE); Andrew Muin, Harsefeld (DE); Markus Schumacher, Buxtgehude (DE)

(73) Assignee: Airbus Operations GmbH, Hamburg (DE)

( * ) Notice: Subject to any disclaimer, the term of this patent is extended or adjusted under 35 U.S.C. 154(b) by 616 days.

(21) Appl. No.: 12/338,227

(22) Filed: Dec. 18, 2008

(65) Prior Publication Data

US 2009/0184126 A1   Jul. 23, 2009

(30) Foreign Application Priority Data

Dec. 28, 2007   (DE) .......................... 10 2007 062 873

(51) Int. Cl.
*B64C 1/20* (2006.01)
*B64C 1/22* (2006.01)
*B65D 88/00* (2006.01)

(52) U.S. Cl.
USPC ...................... 244/118.1; 244/137.1; 220/1.5

(58) Field of Classification Search
USPC ............. 220/562, 1.5, 582; 244/118.1, 118.2, 244/137.1, 118.5, 31, 24, 117 R
See application file for complete search history.

(56) References Cited

U.S. PATENT DOCUMENTS

| | | | | |
|---|---|---|---|---|
| 1,971,637 A | * | 8/1934 | Bellanca | 244/118.1 |
| 2,367,538 A | * | 1/1945 | Sullivan | 244/137.1 |
| 2,441,913 A | * | 5/1948 | Taylor | 244/118.1 |
| 3,781,139 A | * | 12/1973 | Lohse | 417/313 |
| 3,869,102 A | * | 3/1975 | Carroll | 244/36 |
| 3,888,347 A | * | 6/1975 | Kramer | 206/315.9 |

(Continued)

FOREIGN PATENT DOCUMENTS

| | | |
|---|---|---|
| DE | 663 350 | 7/1995 |
| DE | 20 2004 008 090 | 1/2005 |

(Continued)

OTHER PUBLICATIONS

First office action filed in priority application DE 10 2007 062 873. 2-22.

*Primary Examiner* — Milton Nelson, Jr.
(74) *Attorney, Agent, or Firm* — Greer, Burns & Crain Ltd.

(57) ABSTRACT

The idea of the present invention is that an airfreight container according to the invention, which is designed especially for an unpressurized cargo hold of an aircraft, comprises an airtight and pressure-tight container housing with a container interior space for accommodating airfreight goods. This airfreight container furthermore comprises an internal compressed air generating device which is designed for independently generating compressed air for supplying the container interior space with compressed air. The concept according to the invention of an at least partly autonomous airfreight container, which is created as a result, provides that the airfreight container according to the invention, in addition to the pure bundling of goods, now provides, moreover, different supply systems, such as the device for compressed air generation and compressed air provision, corresponding to the specific requirements. The particular advantage of this solution according to the invention is that cargo aircraft now do not have to provide supply systems, or have to provide at least a significantly reduced number of supply systems, in their cargo hold, and all further functions are now fulfilled by the airfreight container itself when required.
The invention also refers to such an aircraft.

24 Claims, 7 Drawing Sheets

U.S. PATENT DOCUMENTS

| | | | |
|---|---|---|---|
| 4,422,304 A | | 12/1983 | Kuttel |
| 4,911,317 A | * | 3/1990 | Schloesser et al. ............ 220/1.5 |
| 5,106,038 A | * | 4/1992 | Dupont ....................... 244/137.1 |
| 5,730,286 A | * | 3/1998 | Eska ........................... 206/315.9 |
| 6,047,588 A | * | 4/2000 | Danilychev .................... 73/23.2 |
| 6,152,287 A | * | 11/2000 | Luria .......................... 198/465.1 |
| 7,221,061 B2 | | 5/2007 | Alger et al. |
| 2004/0226309 A1 | * | 11/2004 | Broussard ....................... 62/236 |
| 2006/0151354 A1 | * | 7/2006 | Dombroski et al. ........ 206/524.8 |
| 2009/0166474 A1 | * | 7/2009 | Erben et al. ................ 244/129.5 |

FOREIGN PATENT DOCUMENTS

| | | |
|---|---|---|
| DE | 10245893 | 7/2006 |
| FR | 2726255 A1 * | 5/1996 |
| WO | 2004/045987 | 6/2004 |

* cited by examiner

AIRFREIGHT CONTAINER AND AIRCRAFT

CROSS REFERENCE TO RELATED APPLICATIONS

This application claims the benefit of German Patent Application No. 10 2007 062 873.2, filed Dec. 28, 2007, the entire disclosure of which is herein incorporated by reference.

FIELD OF THE INVENTION

The invention relates to an airfreight container, especially for an unpressurized cargo hold of an aircraft, and also to such an aircraft.

BACKGROUND OF THE INVENTION

Aircraft today are an indispensable part of a globally functioning transport system. No other mode of transportation in recent years has achieved such high growth rates in transporting capacities as the aircraft. The advantages of this mode of transportation are its speed, safety, and reliability.

In addition to the transporting of passengers, the transporting of goods, the so-called airfreight, is increasingly gaining in importance. The term airfreight covers all goods which can be transported by means of the aircraft mode of transportation, which may include live goods (such as animals, but not persons). Cargo aircraft or passenger aircraft are provided for transporting these goods. Passenger aircraft typically have a cargo hold for example beneath the passenger deck. In contrast, cargo aircraft are provided exclusively for the transporting of airfreight and therefore do not have passenger seats (except for so-called courier seats), but only have a transporting system for corresponding airfreight containers.

In addition to the aforementioned advantages of the aircraft mode of transportation, especially also with regard to the transporting of airfreight, air transportation also has some known disadvantages. In particular, airfreighting is more expensive than surface transporting or transporting by sea. For another thing, an aircraft also has higher fuel consumption. For this reason, there has always existed the requirement of a utilization which is as effective as possible of the cargo hold which is available in the aircraft.

Airfreight containers (or so-called Unit Load Devices (ULDs)) are standardized containers which are specifically provided for the transporting of airfreight and are used to transport luggage, freight, mail, etc. in the cargo hold of corresponding cargo aircraft. These airfreight containers enable large volumes of transported cargo to be bundled into comparatively large units, which altogether shortens the loading operation of the aircraft. Such airfreight containers are typically standardized for use for the different aircraft types, the body cross sections of which can differ from each other. Such airfreight containers are closed containers consisting of aluminium or a combination of aluminium (frames) and plastic (walls, roofs). These airfreight containers, depending upon the type of freight which is located therein, can also have built-in refrigerating units (see FR 2 726 255 A1). In addition, airfreight containers are known which transport the freight in an explosion-safe manner (see EP 617 687 B1).

Aircraft of today operate at flying altitudes at which the temperature lies way below 0° C. and at which the air pressure is extremely low. In order to now create an environment for the protection of some of the goods which are to be transported, such as live animals, which is at least comparable with the environment which prevails on the ground, aircraft of today have supply systems in their cargo hold which serve especially for air conditioning and for pressurization of the cargo hold with compressed air.

The fact that these supply systems and especially the air conditioning and pressuring of the cargo hold significantly limit the design of the body cross section and, moreover, bring with them a weight which is not to be neglected, is problematical. In particular, the aircraft has to have a so-called pressurized body which is designed specifically for pressurizing, for which the body of the aircraft has to be designed in an essentially round or at least oval form. As a result of this, the geometry of a corresponding airfreight container must typically also be orientated towards this body geometry.

In addition to this, many of these supply systems, and especially the compressed air supply system and air conditioning system are always carried along even if these are not at all necessary for much of the transported goods. These supply systems involve an additional weight on the one hand, and on the other hand create additional operating and maintenance costs.

Airfreight containers which are used today furthermore create a relatively high logistical cost if they are not stored in the cargo hold of the aircraft but on the ground or in a warehouse. Above all, for airfreight containers which have to be supplied with a medium, for example with compressed air, oxygen, water, refrigerated or temperature-conditioned air, etc., the corresponding supply chain must not be broken, or at least only briefly broken, for which airfreight containers which are known today are not designed, or designed only with limitations. As already previously mentioned, airfreight containers with an integrated refrigerating unit do indeed exist. However, these airfreight containers are not autonomous since these are still based on a pressurized (that is to say pressurized with compressed air) cargo hold of the aircraft and since, on the other hand, an air conditioning system which is already provided by the aircraft cannot be completely dispensed with in this case. Moreover, an airfreight container with an integrated refrigerating unit typically obtains its power via the aircraft and therefore is not autonomous either to that effect.

SUMMARY OF THE INVENTION

Against this background, it is one of the objects of the present invention to provide an airfreight container for use in an aircraft, and also to provide a corresponding aircraft which manages with minimum systems.

Accordingly, an airfreight container is provided that comprises a pressure-tight container housing having a container interior space for accommodating airfreight goods, and an internal compressed air generating device, which is adapted to independently generate compressed air for supplying the container interior space with compressed air.

Furthermore, an aircraft comprising such an airfright container is also provided.

The general idea upon which the present invention is based is that a cargo aircraft which is provided for the transporting of airfreight frequently carries along a large number of supply systems in the cargo hold which for the most part are not at all necessary for the freight which is to be transported. Based on this knowledge, the idea of the present invention is now that an airfreight container according to the invention, which is designed especially for an unpressurized cargo hold of an aircraft, comprises an airtight or pressure-tight container housing with a container interior space for accommodating airfreight goods. This airfreight container furthermore comprises an internal compressed air generating device which is designed for independently generating compressed air for supplying the container interior space with compressed air and for distributing it in the container interior space.

The concept according to the invention of an at least partly autonomous airfreight container, which is created as a result, provides that the airfreight container, in addition to the pure bundling of goods, now provides, moreover, different supply systems which correspond to the specific requirements which are desired for the transporting of the respective goods. The particular advantage of this solution according to the invention is that cargo aircraft do not have to provide supply systems, or at least have to provide a significantly reduced number of supply systems, for their cargo hold, and that all further functions are fulfilled by the airfreight container itself when required. The airfreight container according to the invention has such integrated supply systems, or these can be connected to the airfreight container according to the invention when required.

Since in the cargo hold of a cargo aircraft a compressed air supply (that is to say compressed air generation, compressed air distribution and air conditioning, which is provided specifically for it, can be dispensed with, the saving in space and weight which is accompanied by it can be used for an additional load in terms of volume and/or weight, as a result of which the airfreight goods which are thus transported can be transported more efficiently and more cost-effectively.

Due to the provision of airfreight containers according to the invention, the supply systems which are required in the cargo hold of a cargo aircraft are altogether reduced to a minimum. Such a minimum design for example can be provided to the effect that only ventilation and low heating of the cargo hold is provided.

In all, the reduction of the supply systems which are required in the cargo hold of a cargo aircraft, and especially an unpressurized design of the cargo hold, also offers the possibility for new, efficient loading systems which no longer have to be designed for a pressurized body, which brings with it significant advantages in the body design of an aircraft.

Since a respective airfreight container now has all the supply systems and functionalities which are specified for it, the cargo which is transported by means of the airfreight container is also very effectively protected outside the cargo hold of the cargo aircraft, which in particular also effectively reduces the logistical cost and also the infrastructural requirements, for example at the airport or in a warehouse, and can continuously ensure the same conditions in the transport chain.

In addition, the solution according to the invention is also advantageous with regard to a reduced maintenance cost since a maintenance of the supply systems, which previously was only able to be undertaken together with the aircraft, can now take place independently of it outside the aircraft.

In one embodiment, the compressed air generating device has a pressure control unit which controls the pressure in the container interior space, especially by variation of the compressed air volume. In this way, it can be ensured that there is always the desired air pressure inside the airfreight container.

In one particular embodiment, the airfreight container is designed in a completely autonomous form. The airfreight container has a separate, local power supply for this purpose, which supplies the airfreight container or at least individual components of the airfreight container with power.

This local power supply may be formed as a fuel cell. Such fuel cells, for safety reasons and with regard to their very low weight, are especially advantageous since they are able to permanently make available the required power with a very low weight. Fuel cells also require little maintenance. In addition, this local power supply can also be formed as a battery, battery pack and especially as a rechargeable battery (accumulator).

It would also be additionally or alternatively conceivable for the airfreight container to be designed in a partly autonomous form and for this purpose to have at least one external electric power connection via which the airfreight container for example can be connected to a power source of the aircraft or to another external power source, and via which the airfreight container or at least individual components of the airfreight container can be externally supplied with power.

A frequent problem in the case of transport systems in general, and especially in the case of cargo aircraft, is that for return flights the airfreight containers cannot be fully utilized with goods which are to be transported (so-called empty flights or transporting empty). Conventional airfreight containers, however, are relatively bulky and even if they are not filled occupy the same space in the cargo hold of the aircraft as filled airfreight containers. This can especially be disadvantageous in the case of the described special containers which are seldom used. In another embodiment of an airfreight container, this is (at least partially) foldable by some or all of the container walls having an at least partially foldable function. When required, this airfreight container can therefore be folded down in a volume-reducing manner to a minimum of the space which is otherwise required for this.

An alternative embodiment provides that the airfreight container has a telescopic rail system for volume reduction of the airfreight container. By means of this telescopic rail system at least oppositely-disposed parts of the airfreight container are designed in a telescopic form, as a result of which a significant space saving can also be realized. Furthermore, in this way the airfreight container can be effectively designed for the required cargo hold and for the goods which are to be transported.

An alternative embodiment provides that the airfreight container is formed for accommodating a plurality of airfreight containers of the same type, which for example can be arranged in the container interior next to each other or nested one inside the other.

A particular embodiment provides that the airfreight container is designed in a modular form. The airfreight container in this case comprises a plurality of container modules which are formed in a manner in which they can be combined with each other and especially detached from each other and/or exchanged. In particular, it can be provided in this case that the airfreight container has a main container for accommodating the airfreight which is to be transported, to which different container modules can be connected when required. These container modules, which can be connected to the main container and also detached again, may have the corresponding supply systems, such as the compressed air generating device or other supply systems. In one embodiment, these different container modules at least partially or completely enclose the main container. In this way, on the one hand an effective protection of the main container on the outside is ensured. These container modules, which at least partially enclose the main container, can additionally or alternatively also function as a support device for the main container, for example if this is formed as a pressurized container and therefore at least partially has a cylindrical shape.

In one embodiment, the airfreight container has a plurality of supply modules for supplying the container interior space with a supply medium, for example with compressed air, oxygen, moisture-enriched air, water, inert gas, etc. A supply module can naturally also serve for power supply. For this purpose, the airfreight container according to the invention has a local power supply, a lighting unit, an air conditioning unit, an oxygen supply unit, a liquid supply unit, a refrigerating unit, a moisture control unit, a protection unit and/or a control and monitoring unit. One or more of these systems and components may be arranged respectively in a container module which is provided specifically for it. It would also be additionally or alternatively conceivable if these components or systems are part of the main container and are therefore arranged inside the airfreight container. Some examples of the aforementioned supply systems are described in the following:

A lighting unit for example can be a conventional lighting system or perhaps also an emergency lighting.

An air conditioning unit for example can include temperature control, moisture control, ventilation, air conditioning, heating, refrigeration and suchlike. Such air conditioning units in the aircraft are frequently also known as ECS systems (Environmental Control System). An ECS system refers to an air conditioning system in the aircraft which comprises the different systems of air supply and temperature control for passengers, such as fresh air feed, heating, and temperature control. This air conditioning system is typically closely associated with the pressure control and for example is required in modern aircraft in order to provide at today's flight altitudes of over 10,000 m an atmosphere with sufficient air pressure, an adequate oxygen saturation of the air and a comfortable environmental temperature.

An oxygen supply unit ensures that the air in the container always has a predetermined oxygen content.

By means of a refrigerating unit, it can be ensured that refrigerated goods in the airfreight container are always kept well refrigerated or perhaps even frozen at a fixed preset low temperature.

A liquid supply unit is especially necessary for such transported goods which during transportation have to be supplied with sufficient liquid. In particular, in the case of fish which is to be transported it is necessary that this is constantly washed round with water during transportation, wherein in this case an oxygen enrichment of the water may be advantageous. In the same way, it is important to provide a defined moisture in the airfreight container for example for certain animals.

A protection unit which is present in the airfreight container for example can refer to an explosion protection. Furthermore, this protection unit can also provide a protection of the container housing against external mechanical or electrical load, or an EMC protection for example for sensitive electronic devices, etc.

In addition, the airfreight container can also have a control and monitoring unit which for example serves for monitoring, data exchange with external control and evaluation units, external access, etc.

In one embodiment, the shape and consequently also the cross section of the airfreight container is designed for a body cross section of an unpressurized aircraft. In a complete break from previous aircraft and their design of the aircraft body, an additional degree of freedom is now possible with the design and the development of an aircraft body since according to the invention the aircraft body no longer has to be designed for a special pressurizing with compressed air. As a result, in addition to the previously available flow-conducive and compressed air-conductive round body cross sections, body cross sections which deviate from it, for example essentially rectangular or square body cross sections of the aircraft, can also be realized, which, however, in the same way are designed in a manner which is as flow-conducive as possible. However, airfreight containers which are cross-sectionally more conducive can advantageously be provided as a result, with which the cargo hold of the corresponding aircraft can be better utilized.

In one embodiment, the airfreight container has an essentially semi-cylindrical container shape which is rounded at the top or bottom. With this semi-cylindrical container shape its container housing comprises flat container walls which are arranged essentially parallel to each other. The container depth may be variably adjusted depending upon the cargo which is to be transported. In particular, in this way a plurality of these semi-cylindrical airfreight containers can also be arranged in the cargo hold of the aircraft in a space-saving manner.

In one particular embodiment, the airfreight container is formed as a pressurized container. Such a pressurized container for example has rounded edges and corners. In a first variant, this pressurized container can be arranged entirely in a housing interior space of an airfreight container which in its inside has the consequently rounded shapes of a pressurized cylinder and which on the outside has essentially cornered shapes of a conventional ULD container. In a second variant, this pressurized container can have the rounded edges and corners of a pressurized container on the outside also.

In another embodiment, the airfreight container has internal supply lines which serve for supplying the airfreight container with compressed air, oxygen, water, power, etc. These internal supply lines may be connectable via external supply connections to corresponding supply lines of other, for example adjacent, airfreight containers. In this way, via an individual supply module of an airfreight container a plurality of airfreight containers in the cargo hold of an aircraft, which do not have a separate supply module, can be supplied.

A typical embodiment of the aircraft according to the invention provides that this is formed as a pure cargo aircraft, the cargo hold of which is therefore exclusively provided for the transporting of airfreight and which is designed exclusively in an unpressurized form. This means that the cargo hold does not include any device at all for compressed air supply, but that this functionality, depending upon whether it is required or not, is provided by a corresponding airfreight container according to the invention. In addition, it would naturally also be conceivable for the aircraft to be formed as a passenger aircraft, the cargo hold of which is therefore also designed in an unpressurized form and consequently does not have a separate compressed air supply.

In one embodiment, the aircraft body of the aircraft has an essentially rectangular cross section, for example an even square cross section. Nevertheless, the shape of the aircraft, and in this case especially of its body on the nose side, still corresponds to the flow-conducive requirements of an aircraft.

In a further embodiment of the invention, the aircraft has an aircraft-internal electric power supply, especially in the region of its cargo hold. By means of this electric power supply, for example partly autonomous airfreight containers which are provided in the cargo hold of the aircraft can be supplied with power as long as these partly autonomous airfreight containers are connected via external supply connections to the aircraft-internal power supply.

BRIEF DESCRIPTION OF THE DRAWINGS

The present invention is explained in more detail below using preferred exemplary embodiments and with reference to the attached figures of the drawings, in which.

In the figures, like reference numerals refer to identical or functionally identical components unless otherwise stated.

DETAILED DESCRIPTION OF THE INVENTION

Figure 1:
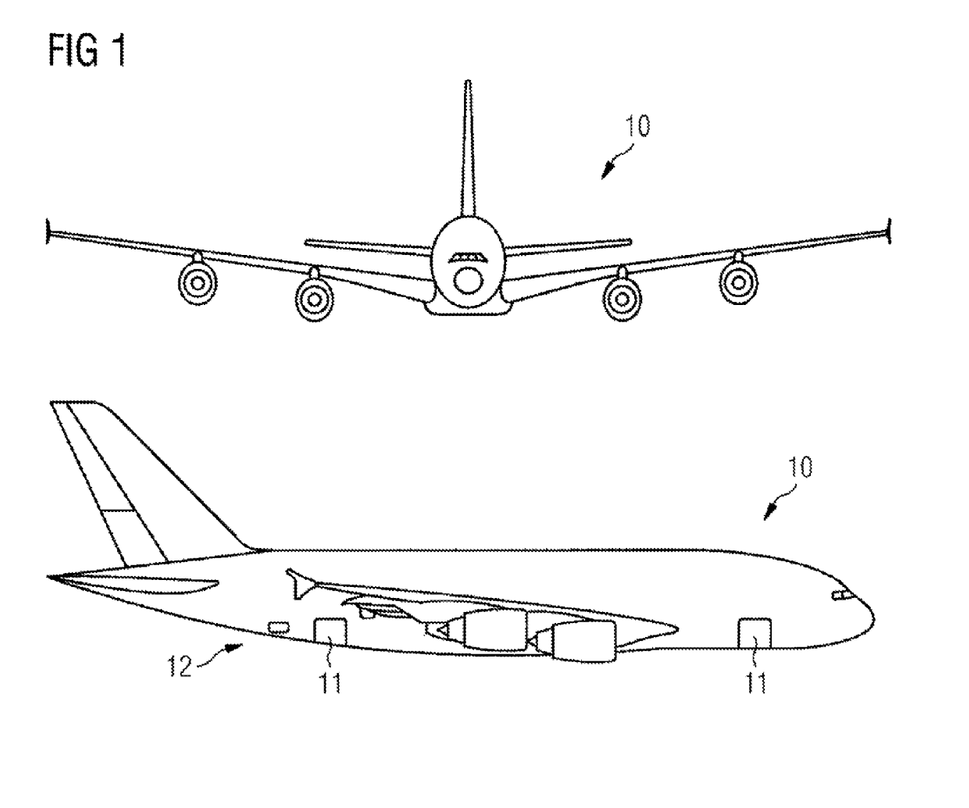
FIG. 1 shows a front and a side view of an aircraft according to the invention.

FIG. 1 shows a side view and a front view of an aircraft according to the invention. The aircraft, which in this case is identified by the designation 10, is formed as a pure cargo aircraft, and on its side and also in its tail has side and rear loading doors 11, 12 via which the cargo aircraft 10 can be loaded, as is explained in a more detailed manner in the following.

Figure 2A:
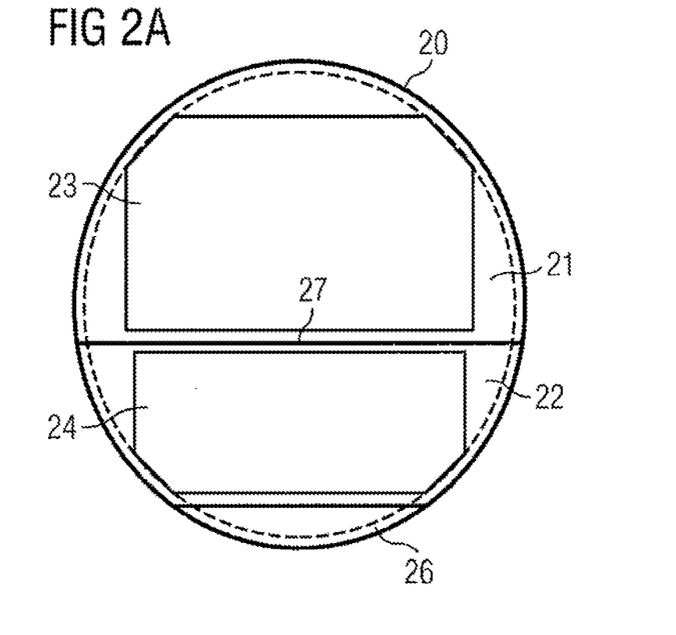
FIGS. 2A, 2B show two body cross sections of an aircraft.
Figure 2B:
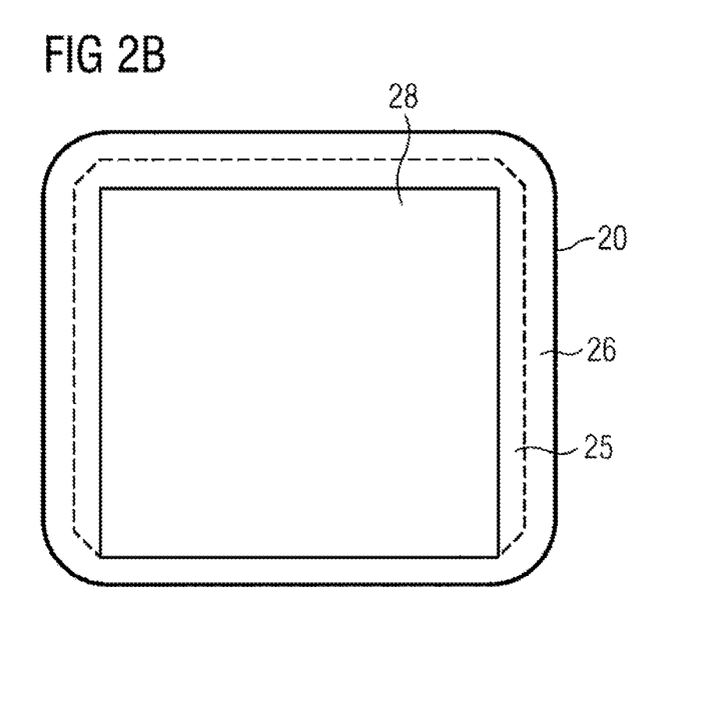

FIGS. 2A und 2B show two possible body cross sections of a transport aircraft 10 according to the invention. The body cross section 20 in FIG. 2A has an upper cargo hold 21 and a lower cargo hold 22 which is separated from it by means of a floor 27, which cargo holds are designed for accommodating respective airfreight containers 23 or 24. In the example which is shown, these airfreight containers 23, 24 are differently dimensioned in each case for the upper and the lower cargo holds 21, 22, wherein this does not have to be absolutely necessary.

The cross section of the body 20 in FIG. 2A is designed in a round form and therefore corresponds essentially to a body cross section of the cargo aircraft 10 which is shown in FIG. 1. In contrast to this, the cross section of the body 20 in FIG. 2B is designed in an essentially rectangular form, as a result of which the corresponding cargo hold 25 also has an essentially rectangular cross section. As a result, essentially cubic airfreight containers 28 can also be transported by a cargo aircraft which has a body cross section 20 which is formed in conformance with FIG. 2B. In particular, the side and lower regions of the cargo hold 25, which for example in the case of the exemplary embodiment which is shown in FIG. 2A, or even in the case of other conventional aircraft bodies, are marginally or barely suitable for the transporting of airfreight, can be utilized more effectively. Therefore, in the case of the example of a body cross section which is shown in FIG. 2B, a more effective utilization of the entire cargo hold 25 of the aircraft 10 is possible.

The cargo aircraft 10 according to the invention does not have, according to the invention, a device for compressed air generation in its cargo hold 21, 22, 25 and especially does not even have any supply systems at all for supplying the cargo hold 21, 22, 25 with any medium. These supply systems, which in conventional cargo aircraft are arranged in the wall region of the cargo hold, are dispensed with in a cargo aircraft 10 according to the invention. This wall region 26 consequently occupies a smaller space in a cargo aircraft according to the invention, as a result of which a larger cargo hold 21, 22, 25 is consequently also made available.

In the absence of a device for compressed air generation in the cargo aircraft, the body 20 in the examples of FIGS. 2A and 2B is therefore not designed as a pressurized body either. However, if there is the requirement for transporting certain goods, such as live animals, in a predetermined compressed air, airfreight containers according to the invention are provided. These airfreight containers according to the invention, which are subsequently dealt with in more detail with reference to FIGS. 3 to 11, have at least one device for compressed air generation, by means of which compressed air can be generated inside the respective airfreight container so that a compressed air atmosphere inside the container can be created. In addition, these airfreight containers according to the invention can also comprise further supply systems so that these airfreight containers according to the invention are designed in an autonomous or at least partly autonomous form.

Figure 3:
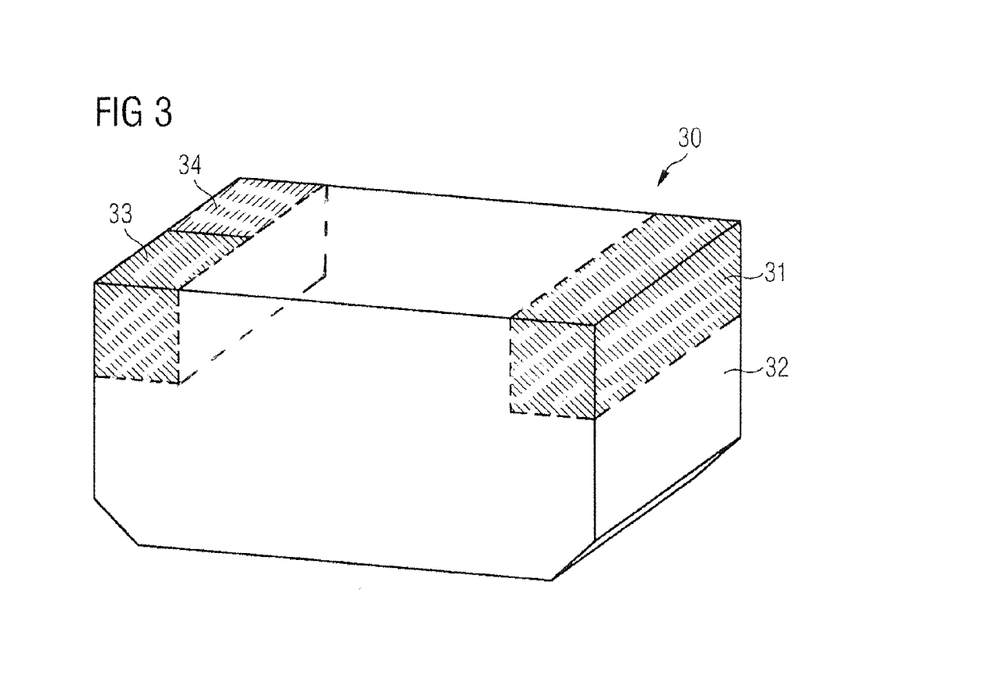
FIG. 3 shows a first, general exemplary embodiment of an airfreight container according to the invention.

FIG. 3 shows a first exemplary embodiment of an airfreight container according to the invention, which in this case is identified by the designation 30. This airfreight container 30 in this case is only formed for example as an airfreight container 30 of housing type AKH, but can also have an optionally different shape. The airfreight container 30 according to the invention contains a separate device 31 for compressed air generation which is arranged inside the housing 32 of the airfreight container 30. Such devices 31 for compressed air generation are generally known per se, so that they do not have to be dealt with in more detail. Reference may simply be made to the fact that this compressed air generating device 31 comprises at least one compressor for generating the compressed air and also a pump and supply lines via which the generated compressed air is transported to the corresponding points in the container interior space.

In addition to the device 31 for compressed air generation, the airfreight container 30 according to the invention additionally comprises further systems 33 and components for the autonomous or at least partly autonomous supply of the airfreight container 30. In particular, these further systems 33 can also comprise a separate power supply 34 which for example is formed as a fuel cell and which is therefore suitable for independently supplying the autonomous supply systems 31, 33 which are provided inside the airfreight container 30 with power.

Figure 4:
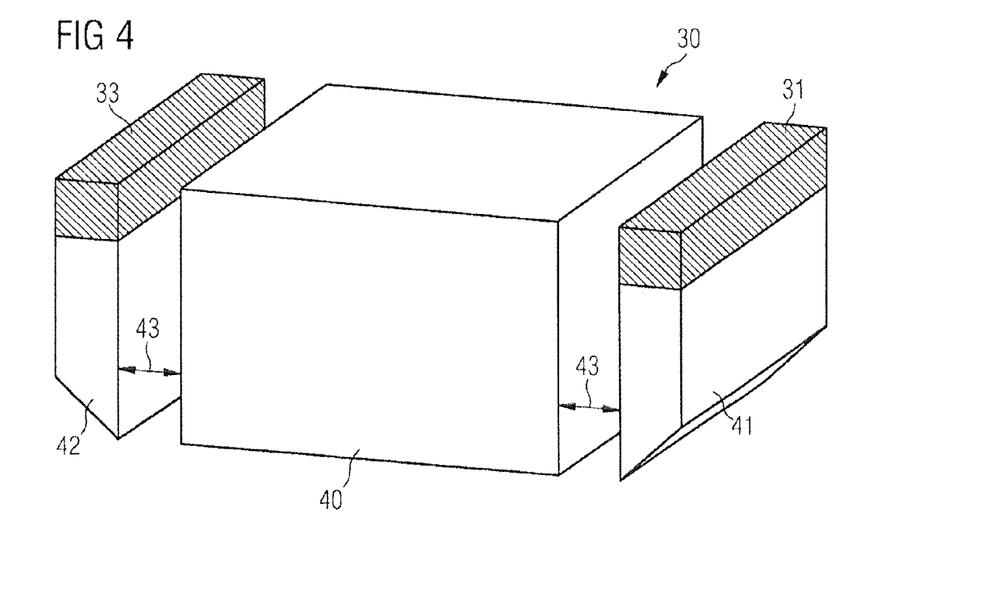
FIG. 4 shows a second exemplary embodiment of an airfreight container according to the invention, which is of modular construction.

FIG. 4 shows a second exemplary embodiment of an airfreight container 30 according to the invention, which in this case is designed in a modular form and which in addition to a central main container 40 has two side container modules 41, 42. These two container modules 41, 42 can be connected to the main container 40 or detached again, which is indicated by the arrows 43. In the present exemplary embodiment, the one container module 41 comprises the device 31 for compressed air generation and the other container module 42 comprises further supply systems 33 of the airfreight container 30. As a result of the modular form of the airfreight container 30 and also as a result of the implementation of such supply systems 31, 33 in container modules 41, 42 which are provided separately for them and which can be detached from the main container 40, a variably usable airfreight container 30 can be provided, which has only such supply systems 31, 33 which are necessary for the transporting of a respective air cargo.

Figure 5:
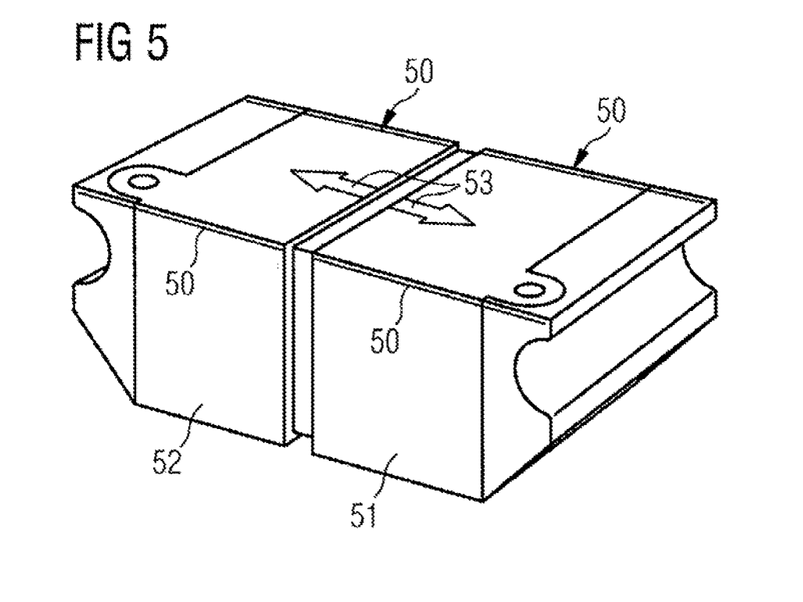
FIG. 5 shows a third exemplary embodiment of an airfreight container according to the invention, which in this case is designed in a telescopic form.

FIG. 5 shows a further exemplary embodiment of an airfreight container 30 according to the invention, the housing of which has a sliding unit 50. By means of this sliding unit 50, which for example comprises telescopic rails which can slide together and slide apart, the housing, within certain limits which are contingent upon the construction of the airfreight container 30, can be displaced, and in this way are brought to a desired size. These two housing sections 51, 52 can therefore be slid into each other or slid away from each other again, which is indicated by the arrows 53 in FIG. 5. The particular advantage of these housing sections 51, 52 which can slide into each other is that the airfreight container 30 can consequently be designed for different body cross sections in each case and therefore can be used for aircraft with varying body cross section. A further advantage is that the contents of the container can also be optimized for the desired volume of the goods which are to be transported.

Figure 6:
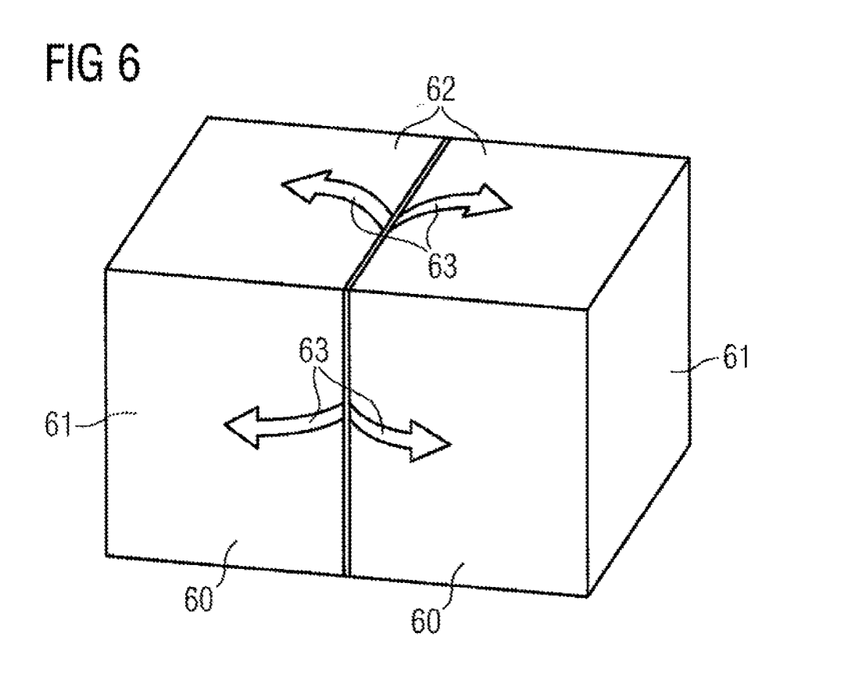
FIG. 6 shows a fourth exemplary embodiment of an airfreight container according to the invention, which in this case is designed in a foldable form.

FIG. 6 shows a further exemplary embodiment of an essentially cubic airfreight container which in this case is designed in a foldable form. For the foldable function, the housing sections 60-62, and in this case especially their walls 60, 61 and roof elements 62, can be unfolded and especially folded into each other again, which is indicated in FIG. 6 by the arrows 63. For this purpose, individual housing walls 60 are designed in a segmented form in order to enable the foldable function in this way. Ideally, all the housing walls 60-62 can thus be folded into each other, as a result of which the airfreight container 30 can be folded down in a very space-saving manner and so is especially suitable for transporting empty.

Figure 7:
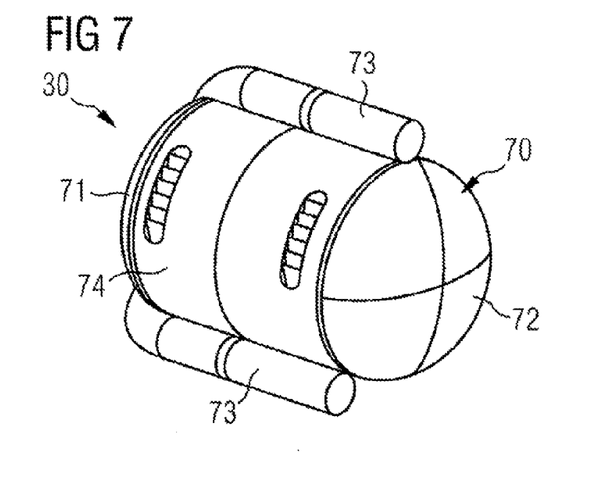
FIG. 7 shows a fifth exemplary embodiment of an airfreight container according to the invention, which in this case is formed as a pressurized container.

FIG. 7 shows a further exemplary embodiment of an airfreight container 30 according to the invention, which in this case is formed as a pressurized container 70. Such pressurized containers are closed containers, the pressure of which in the container interior space lies, or can lie, above the ambient pressure. Such pressurized containers are ideally formed as a sphere or typically in a cylindrical shape, wherein its cylindrical casing 74 is closed off on both sides by means of flat or curved bottoms 71, 72. In addition to the cylindrical container housing 74, the airfreight container 70 according to the invention in FIG. 7 also has three supply modules 73 which are attached on the outside on the cylindrical container casing 74 and which serve for the supply of the airfreight container 70. In one of these supply modules 73, for example the device for compressed air generation and distribution can be arranged. These supply modules 73 may also be detachable again from the container housing 74. It would also be alternatively conceivable for more than three supply modules 73 to be provided.

Figure 8A:
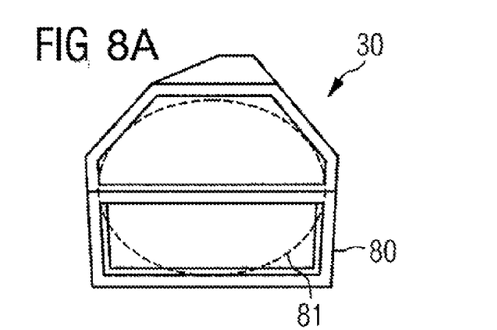
FIG. 8A-8B show a third exemplary embodiment of an airfreight container according to the invention, which as a pressurized container has an essentially cubic housing shape.
Figure 8B:
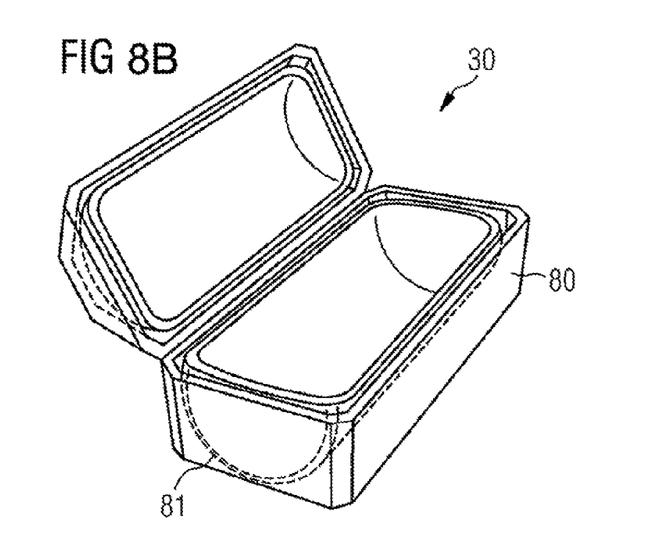

FIG. 8 shows a further example of an airfreight container 30, which is formed as a pressurized container, in cross section and perspectively. In this case, the airfreight container 30 is indeed similarly cylindrically formed with regard to its interior space and therefore suitable for high internal pressures. However, this internally-cylindrical pressurized container 80 is enclosed by an essentially cubic container housing 81. This exemplary embodiment is advantageous since on account of the cubic shape of the container housing 81 it enables a simple ease of handling, transporting and storing of the airfreight container 30, and on the other hand also includes the advantages of a pressurized container 80.

Figure 9:
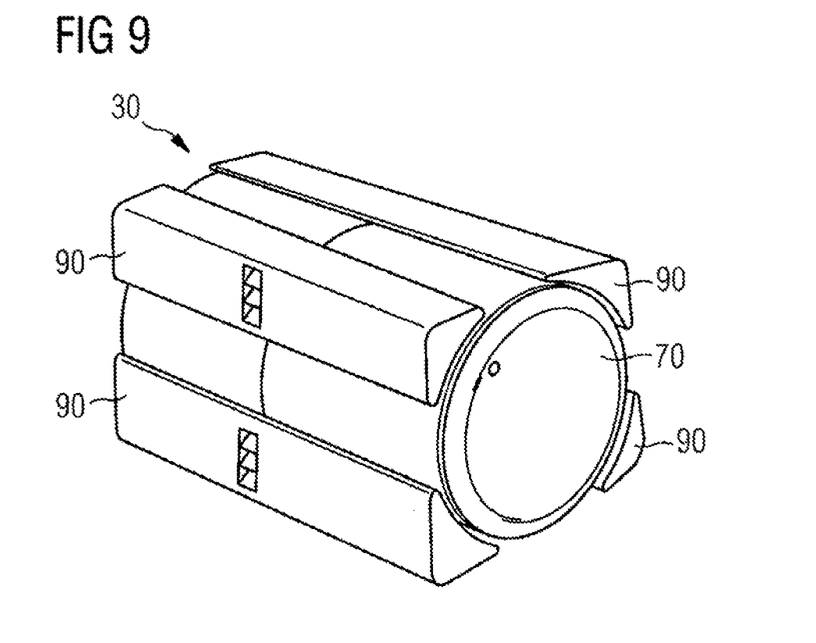
FIG. 9 shows a seventh exemplary embodiment of an airfreight container according to the invention, to the outer side of which the container modules, which enclose the container housing, are at least partially adapted.

The exemplary embodiment in FIG. 9 shows an airfreight container 30 with a pressurized container 70 and four supply modules 90 which are adapted to the outside contour of the pressurized container and which in the adapted state impart to the airfreight container an approximately cubic outside contour. In this way, the advantages of simple transporting and simple handling are also combined with the advantage of a pressurized container 70. These supply modules 90 may also be flexibly formed, or at least partially flexibly formed, and therefore also offer an effective protection of the pressurized container 70 on the outside.

Figure 10:
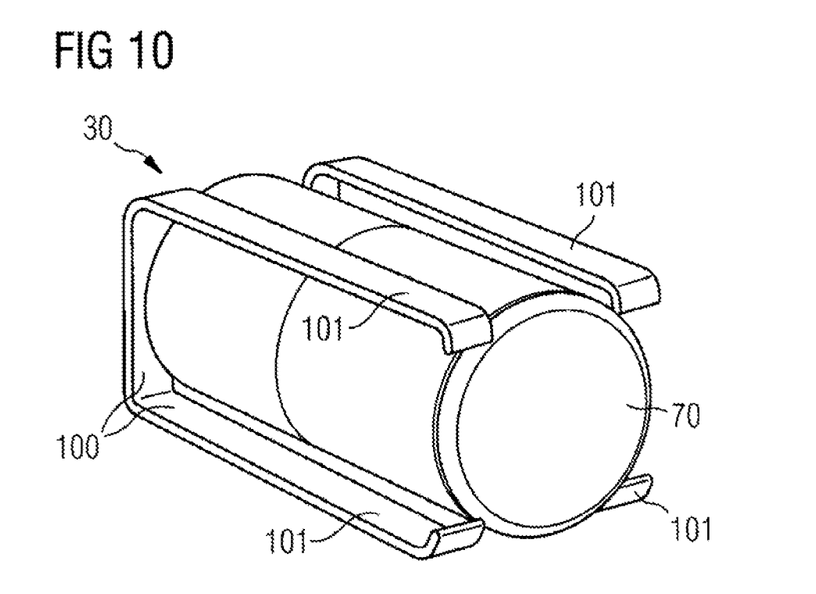
FIG. 10 shows an eighth exemplary embodiment of an airfreight container according to the invention, which has a supporting and protective frame for supporting the container housing.

FIG. 10 shows a further exemplary embodiment of an airfreight container 30 according to the invention, which in addition to a pressurized container 70 also has a protective frame 100.

This protective frame 100 is formed in a way in which the pressurized container 70 is embedded inside this protective frame 100 on the one hand and is therefore well protected against an external load. On the other hand, the pressurized container 70 also bears upon this protective frame 100 so that in this case the protective frame 100 also provides a supporting and securing function for the pressurized container 70 so that this for example cannot become undesirably dislodged within the protective frame 100. For this purpose, the protective frame 100 has four lateral clamps 101 on the lateral edges of the pressurized container 70, which on the one hand are to ensure a protection for the pressurized container 70 and on the other hand are to ensure a dislodgement stability of the pressurized container. By means of this protective frame 100, the pressurized container 70 for example can also be installed vertically, which for transport-technological reasons, however, can also be advantageous for its operation.

Figure 11:
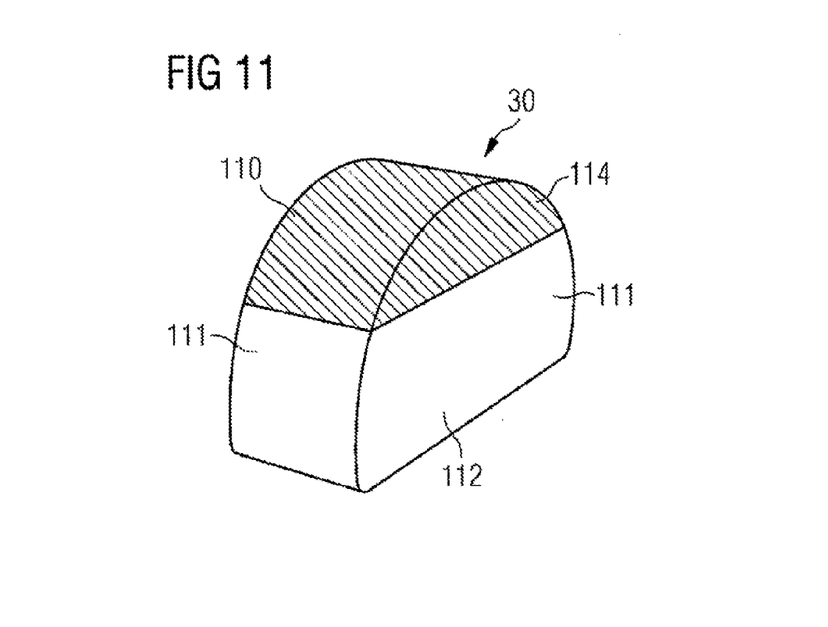
FIG. 11 shows a ninth exemplary embodiment of an airfreight container according to the invention, which in this case is provided with rounded corners.

FIG. 11 shows an embodiment of an airfreight container according to the invention. This airfreight container 30 in this case has a semi-cylindrical container housing 110 which on its front sides has flat, essentially parallel container walls 111. This semi-cylindrical airfreight container 30 also has a flat container bottom 112 which serves for the secure supporting of the airfreight container 30. The semi-cylindrical airfreight container 30 in the upper region 114 also has a supply unit which especially includes the device for compressed air supply for the airfreight container. In addition, further systems and components, which can be provided for supplying the airfreight container 30, can also be arranged here.

Figure 12:
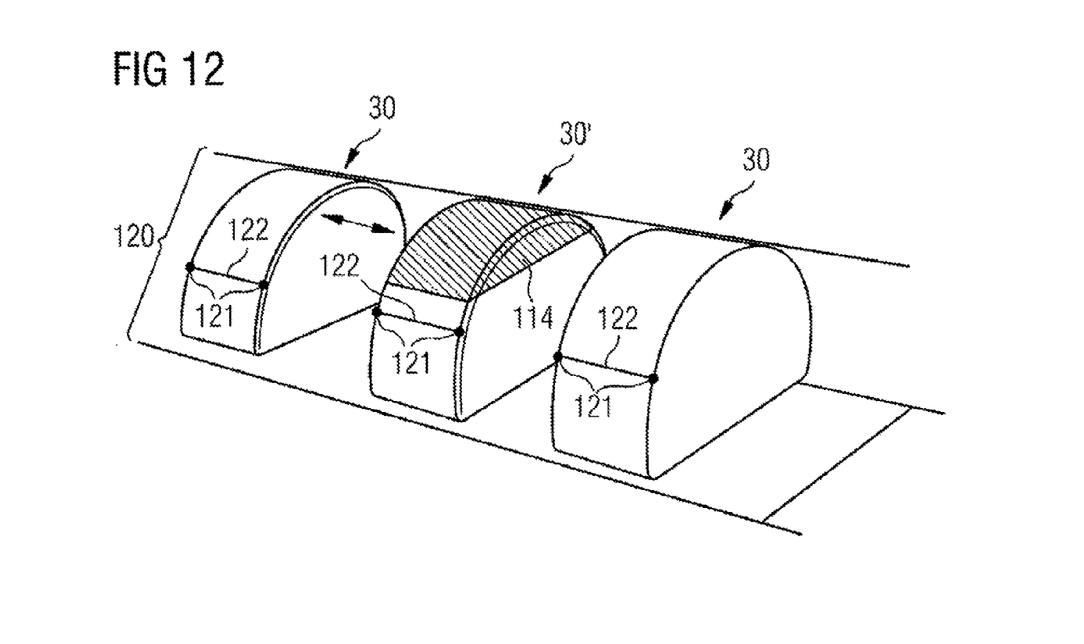
FIG. 12 shows a much schematized detail of a cargo hold of a cargo aircraft according to the invention, in which three airfreight containers which correspond to FIG. 11 are arranged.

FIG. 12 shows a much schematized detail of a cargo hold 120 of a cargo aircraft according to the invention, in which three semi-cylindrical airfreight containers 30, which correspond to the exemplary embodiment in FIG. 11, are arranged in a row and one behind the other. On account of the flat, vertically extending container walls 111, these semi-cylindrical airfreight containers 30 can be grouped together so that these can be placed side-by-side in an extremely tight space, which for space reasons is especially effective. Furthermore, this also has the advantage that for example one of these airfreight containers 30, which for example has a device for compressed air generation, supplies the remaining semi-cylindrical airfreight containers 30 with compressed air via a supply line 122 which connects the airfreight containers 30. This also applies to the supply of the different airfreight containers 30 with other supply media, such as for example oxygen, water, temperature-conditioned air, power, data signals, etc. For this purpose, the airfreight containers 30, which stand directly against each other, only need to have an interface with supply connections 121 at respectively opposite points in order to interconnect adjacent airfreight containers 30 and therefore to enable an exchange of a supply medium or of an electrical signal between the airfreight containers 30.

Although the present invention was explained in the above based on preferred exemplary embodiments, it is not limited to these but can be varied in a chosen manner.

In particular, the present invention is not limited exclusively to pure cargo aircraft, but can also be extended to passenger aircraft with a cargo hold which is provided specifically for the cargo.

The invention is not limited exclusively either to the dimensions and shapes of airfreight containers which are specified in the preceding exemplary embodiments. Rather, these are presented only for the sake of clarity and can also be optionally modified without deviation from the essence of the present invention as a result. It is essential with regard to an airfreight container according to the invention simply that this has a separate device for compressed air generation and distribution and that the aircraft is designed without pressurization in its cargo hold, but does not have such a compressed air generating device. In addition, this airfreight container according to the invention can naturally also be designed for further systems and components for supplying the airfreight container with other media or electrical signals, although this is not absolutely necessary.

Also, the modularity of an airfreight container is to be understood in this case only as exemplary but not as a mandatory feature.

What is claimed is:

1. A unit load device, comprising:
   a pressure-tight container housing having a container interior space for accommodating airfreight goods, and
   an internal compressed air generating device, which is adapted to independently generate compressed air for supplying the container interior space with compressed air.

2. The unit load device according to claim 1, wherein the compressed air generating device comprises a pressure control unit, which controls the pressure in the container interior space.

3. The unit load device according to claim 1, adapted for use in an unpressurized cargo hold of an aircraft.

4. The unit load device according to claim 1, wherein the unit load device is partly autonomous and comprises a power supply connection via which the unit load device or at least components of the unit load device can be externally supplied with power or an energy carrier.

5. The unit load device according to claim 1, having internal supply lines which via external supply connections can be connected to corresponding supply lines of other unit load devices.

6. The unit load device according to claim 1, wherein the unit load device comprises at least partially foldable container walls.

7. The unit load device according to claim 1, comprising a telescopic rail system, by which oppositely-disposed walls or parts of the unit load device can be slid together.

8. The unit load device according to claim 1, wherein the unit load device is adapted to accommodate a plurality of unit load devices of the same type in its container interior space.

9. The unit load device according to claim 1, comprising at least one of a local power supply, a lighting device, an air conditioning unit, a cooling or heating unit, an oxygen supply unit, a liquid supply unit, a moisture control device, a protection unit and a control and monitoring unit, these components being arranged in at least one container module.

10. The unit load device according to claim 1, wherein a cross section of the unit load device is adapted to a body cross section of an unpressurized aircraft, a cargo hold of which is equipped without a compressed air generating device.

11. The unit load device according to claim 1, the unit load device having a substantially semi-cylindrical, rounded container shape, the container housing of which on a face end side comprises two flat container walls which are arranged essentially parallel to each other.

12. The unit load device according to claim 1, the unit load device being formed as a pressurized container.

13. The unit load device according to claim 1, wherein the unit load device is completely autonomous and comprises a local power supply, which supplies the unit load device or at least components of the unit load device with power.

14. The unit load device according to claim 13, wherein the unit load device comprises a rechargeable power source.

15. The unit load device according to claim 14, wherein the rechargeable power source comprises an accumulator or a fuel cell.

16. The unit load device according to claim 1, wherein the unit load device is designed in modular form and comprises a plurality of detachable and/or exchangeable container modules.

17. The unit load device according to claim 16, wherein the compressed air generating device is disposed in a separate container module.

18. The unit load device according to claim 16, comprising a plurality of container modules, which at least partially enclose the container housing.

19. The unit load device according to claim 16, wherein the unit load device comprises a plurality of supply modules for supplying the container interior space with a supply medium.

20. An aircraft, comprising at least one unpressurized cargo hold section of a cargo hold including at least one unit load device according to claim 1.

21. The aircraft according to claim 20, wherein the aircraft is a cargo aircraft, the cargo hold of which is exclusively unpressurized.

22. The aircraft according to claim 20, comprising an aircraft-internal electric power supply, by which partly autonomous unit load devices which are provided in the cargo hold can be supplied with power.

23. The aircraft according to claim 20, whose aircraft body has a substantially rectangular cross section.

24. The aircraft according to claim 23, comprising an aircraft body having a square body cross section.

* * * * *